United States Patent

Schumnig

(10) Patent No.: US 9,494,047 B2
(45) Date of Patent: Nov. 15, 2016

(54) EXHAUST-GAS TURBOCHARGER

(75) Inventor: Oliver Schumnig, Gundersheim (DE)

(73) Assignee: BorgWarner Inc., Auburn Hills, MI (US)

(*) Notice: Subject to any disclaimer, the term of this patent is extended or adjusted under 35 U.S.C. 154(b) by 227 days.

(21) Appl. No.: 13/879,814

(22) PCT Filed: Oct. 21, 2011

(86) PCT No.: PCT/US2011/057256
§ 371 (c)(1),
(2), (4) Date: Apr. 17, 2013

(87) PCT Pub. No.: WO2012/058110
PCT Pub. Date: May 3, 2012

(65) Prior Publication Data
US 2013/0294948 A1    Nov. 7, 2013

(30) Foreign Application Priority Data

Oct. 27, 2010 (DE) .................. 10 2010 049 858

(51) Int. Cl.
| F16C 25/04 | (2006.01) |
| F01D 25/16 | (2006.01) |
| F16C 17/10 | (2006.01) |

(52) U.S. Cl.
CPC ............ *F01D 25/164* (2013.01); *F01D 25/16* (2013.01); *F16C 17/10* (2013.01); *F16C 25/04* (2013.01); *F05D 2220/40* (2013.01); *F16C 2360/24* (2013.01)

(58) Field of Classification Search
CPC ............ F04D 29/024; F04D 29/0563; F04D 29/063; F16C 17/02; F16C 27/02; F16C 33/10; F16C 33/1045; F16C 2360/24
USPC ............ 384/218, 219, 295, 296; 417/407
See application file for complete search history.

(56) References Cited

U.S. PATENT DOCUMENTS

| 3,993,370 A | 11/1976 | Wollenweber |
| 4,355,850 A * | 10/1982 | Okano .................. 384/121 |
| 4,838,711 A * | 6/1989 | Munkel .................. 384/215 |
| 6,499,884 B1 | 12/2002 | Svihla et al. |
| 7,025,579 B2 | 4/2006 | Wollenweber et al. |
| 2010/0163005 A1 | 7/2010 | Meier et al. |

* cited by examiner

*Primary Examiner* — Patrick Hamo
(74) *Attorney, Agent, or Firm* — A. Michael Tucker; Stephen A. Pendorf; Patent Central LLC

(57) ABSTRACT

An exhaust-gas turbocharger (1) having a compressor (2) which has a compressor wheel (3) in a compressor housing (4); a turbine (5) which has a turbine wheel (6) in a turbine housing (7); and a bearing housing (8) which holds a stationary bearing bush (9) for a rotor shaft (10) and which has, at the compressor side, a bearing housing cover (11). The bearing bush (9) is provided with axial bearing surfaces (12, 13) and is fixed in the bearing housing (8) in a non-positively locking fashion.

8 Claims, 1 Drawing Sheet

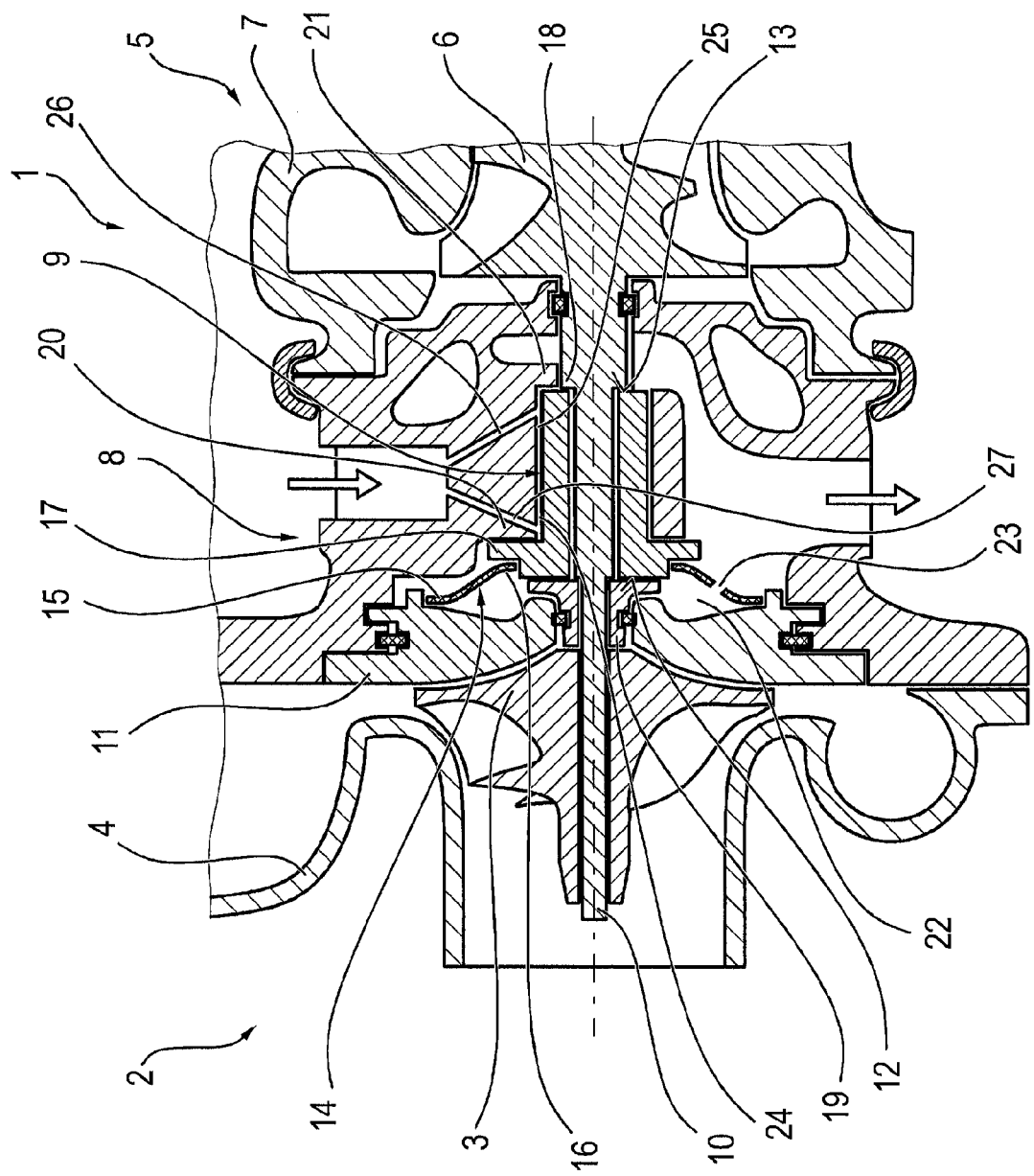

EXHAUST-GAS TURBOCHARGER

BACKGROUND OF THE INVENTION

Field of the Invention

The invention relates to an exhaust-gas turbocharger according to the preamble of claim 1.

Description of the Related Art

The fact that the generic exhaust-gas turbocharger is provided with a non-positive radial bearing bush and additionally with an axial bearing results in a relatively high number of parts to be assembled, and therefore in relatively long assembly times.

It is therefore an object of the present invention to provide an exhaust-gas turbocharger of the type specified in the preamble of claim 1, the technical construction of which is simplified.

BRIEF SUMMARY OF THE INVENTION

Said object is achieved by means of the features of claim 1.

It is consequently possible according to the invention for a single unitary bearing bush to be provided in the bearing housing. which bearing bush permits both the radial mounting and also the axial mounting of the rotor shaft.

The non-positively locking fixing of the bearing bush in the bearing housing also yields the advantage that no further securing elements are required for the axial stop of the bearing bush, which results in a further reduction in the number of parts and therefore a cost reduction.

A further cost reduction is obtained as a result of the reduction in assembly time.

Furthermore, the axial structural dimensions of the exhaust-gas turbocharger according to the invention can be reduced because the bearing bush comprises both the radial bearing points and also the axial bearing points, such that a separate axial bearing can be dispensed with.

The fact that the bearing bush is held seated in a non-positively locking manner, such as for example by spring force, results in a further simplification in relation to known techniques such as for example positive locking by means of securing pins, wherein the bearing bush continues to have sufficient radial play despite the fixing.

The subclaims relate to advantageous refinements of the invention,

If a preload device is used to generate the non-positively locking fixing, said preload device may be supported for example with one end region against the bearing housing cover and with the other end region against an abutment collar of the bearing bush. This makes it possible for an oil collecting chamber to be arranged between the preload device and the bearing cover, which in turn yields a reduction in oil leakage because outwardly centrifuged oil can be intercepted in said oil collecting chamber and discharged through oil outflow bores provided for example in the preload device.

The bearing housing cover may be screwed, clamped or connected by means of a circlip or a bayonet connection to the bearing housing, wherein screw-free connections are preferable. The bearing housing cover itself, without further components, may form the preload device.

The axial bearing surfaces of the bearing bush are supported at the turbine side via the rotor shaft and at the compressor side via a sealing bush.

Overall, the design according to the invention yields not only the advantages already explained but also the possibility of greater degrees of freedom for the separability of the bearing housing.

The preload device should be designed in terms of its dimensioning such that the preload force is greater than the maximum axial force occurring in the direction of the compressor during operation of the exhaust-gas turbocharger.

BRIEF DESCRIPTION OF THE SEVERAL VIES OF THE DRAWINGS

Further details, advantages and features of the present invention will emerge from the following description of an exemplary embodiment on the basis of the drawing. The single FIGURE of the drawing shows a schematically simplified illustration of an exhaust-gas turbocharger 1 according to the invention having a compressor 2 and a turbine 5.

DETAILED DESCRIPTION OF THE INVENTION

The compressor 2 has a compressor wheel 3 arranged in a compressor housing 4. The turbine 5 has a turbine wheel 6 arranged in a turbine housing 7.

A bearing housing 8 is arranged between the compressor housing 4 and the turbine housing 7. The bearing housing 8 has a unitary bearing bush 9 for a rotor shaft 10 and has a bearing housing cover 11 at the compressor side.

According to the invention, the bearing bush 9 is provided with axial bearing surfaces 12 and 13 arranged on the end sides, wherein the axial bearing surface 12 is the compressor-side bearing surface whereas the axial bearing surface 13 constitutes the turbine-side bearing surface.

Furthermore, the bearing bush 9 has radial bearing surfaces 24 and 25 which can be supplied with oil via oil inflow bores 26 and 27. Here, the bearing bush 9 is not clamped in the bearing housing 8 but rather is dimensioned such that a gap remains between the outer circumference of the bearing bush 9 and the inner bore of the bearing housing 8, to which gap oil can be supplied.

The bearing bush 9 is retained in the bearing housing 8 by means of non-positive locking, for which purpose, in the illustrated example, a preload device 14 is provided which imparts the preload force required for the non-positive connection in order that the bearing bush 9 can be arranged in the bearing housing 8.

In the illustrated embodiment, the preload device 14 is designed as a plate spring. Here, one end region 15 of the preload device 14 is supported against the bearing housing cover 11, and the other end region 16 of the preload device 14 is supported against an abutment collar 17 which is of greater diameter than the main body of the bearing bush 9 and which is integrally connected to the main body of the bearing bush 9.

In the axial direction, the bearing bush 9 can be supported against either a housing shoulder 20 or a housing shoulder 21, wherein the housing shoulder 20 is oriented toward the compressor side, whereas the housing shoulder 21 is oriented toward the turbine side, as can be seen directly from the diagrammatic illustration.

As can also be seen from the FIGURE, the rotor shaft 10 has a shaft step 18 which constitutes a counterpart surface for the turbine-side axial bearing surface 13 of the bearing bushes 9.

The compressor-side axial bearing surface 12 of the bearing bushes 9 is supported on a sealing bush 19 which is arranged on the rotor shaft 10.

In the illustrated embodiment, the preload device 14 together with the bearing housing cover 11 delimits an oil collecting chamber 22 in which oil centrifuged radially away from the rotor shaft 10 can be intercepted. To permit oil recirculation, the oil collecting chamber 22 has at least one oil outflow opening 23 which, in the example, is formed in the preload device 14.

In addition to the above written disclosure of the invention, reference is hereby explicitly made, so as to complement said written disclosure, to the diagrammatic illustration of the invention in the single FIGURE.

LIST OF REFERENCE NUMERALS

1 Exhaust-gas turbocharger
2 Compressor
3 Compressor wheel
4 Compressor housing
5 Turbine
6 Turbine wheel
7 Turbine housing
8 Bearing housing
9 Bearing bush
10 Rotor shaft on which the compressor wheel 3 and the turbine wheel 6 are arranged
11 Bearing housing cover
12, 13 Axial bearing surfaces
14 Preload device
15, 16 End regions
17 Abutment collar
18 Shaft step
19 Sealing bush
20, 21 Housing shoulder
22 Oil collecting chamber
23 Oil outflow opening
24, 25 Radial bearing points
26, 27 Oil inflow bores

The invention claimed is:

1. An exhaust-gas turbocharger (1) having
a compressor (2) including a compressor wheel (3) in a compressor housing (4);
a turbine (5) including a turbine wheel (6) in a turbine housing (7);
a rotor shaft (10), wherein said compressor wheel (3) is mounted at one end of the shaft (10) and said turbine wheel (6) is mounted at the other end of the shaft (10); and
a bearing housing (8), wherein the compressor housing (4) is mounted to one side of the bearing housing (8) and the turbine housing (7) is mounted to the opposite side of the bearing housing (8), which bearing housing (8) supports a stationary unitary bearing bush (9) for both the radial mounting and also the axial mounting of the rotor shaft (10) and which bearing housing (8) has, at the side to which the compressor housing (4) is mounted, a bearing housing cover (11),
wherein the stationary unitary, bearing bush (9) is provided with at least one radial bearing surface for radial support of said rotor shaft (10), with first and second axial bearing surfaces (12, 13) at first and second axial ends of the stationary unitary bearing bush (9), and wherein a preload device (14) is provided for generating an axial fixing spring force for the stationary unitary bearing bush (9) greater than the maximum axial force occurring in the direction of the compressor during operation of the exhaust-gas turbocharger, and wherein said stationary unitary bearing bush (9) is fixed against rotation.

2. An exhaust-gas turbocharger (1) having
a compressor (2) including a compressor wheel (3) in a compressor housing (4);
a turbine (5) including a turbine wheel (6) in a turbine housing (7);
a rotor shaft (10), wherein said compressor wheel (3) is mounted at one end of the shaft (10) and said turbine wheel (6) is mounted at the other end of the shaft (10); and
a bearing housing (8), wherein the compressor housing (4) is mounted to one side of the bearing housing (8) and the turbine housing (7) is mounted to the opposite side of the bearing housing (8), which bearing housing (8) supports a stationary unitary bearing bush (9) for both the radial mounting and also the axial mounting of the rotor shaft (10) and which bearing housing (8) has, at the side to which the compressor housing (4) is mounted, a bearing housing cover (11),
wherein the stationary unitary, bearing bush (9) is provided with at least one radial bearing surface for radial support of said rotor shaft (10), with first and second axial bearing surfaces (12, 13) at first and second axial ends of the stationary unitary bearing bush (9), and with an abutment collar (10) having first and second axial faces, wherein one abutment collar axial face is flush against the bearing housing, and the other is acted upon by a preload device (14) for generating an axial fixing spring force which spring force acts axially against the stationary unitary bearing bush (9) greater than the maximum axial force occurring in the direction of the compressor during operation of the exhaust-gas turbocharger, wherein said stationary unitary bearing bush (9) is fixed against rotation, and
wherein the preload device (14) has a first end region and a second end region, and wherein the a first end region (15) bears against the bearing homing cover (11) and the second end region (16) bears against an abutment collar (17) of the bearing bush (9).

3. The exhaust-gas turbocharger as claimed in claim 1, wherein the preload device (14) is a plate spring.

4. The exhaust-gas turbocharger as claimed in claim 1, wherein the rotor shaft (10) has a shaft step (18) on the turbine side of the rotor shaft (10) as a counterpart surface for the axial bearing surface (13).

5. The exhaust-gas turbocharger as claimed in claim 4, wherein the axial bearing surface (12) closest to the compressor is supported against a sealing bush (19) fixed on the rotor shaft (10).

6. The exhaust-gas turbocharger as claimed in claim 5, wherein the bearing housing (8) has at least one housing shoulder (20, 21) for axially supporting the bearing bush (9).

7. The exhaust-gas turbocharger as claimed in claim 1, wherein the preload device (14) and the bearing housing cover (11) delimit an oil collecting chamber (22).

8. The exhaust-gas turbocharger as claimed in claim 7, wherein the oil collecting chamber (22) has at least one oil outflow opening (23).

* * * * *